J. S. STEVENSON.
TIRE.
APPLICATION FILED DEC. 23, 1907.

934,472.

Patented Sept. 21, 1909.
2 SHEETS—SHEET 1.

Witnesses
W. K. Ford
James O. Barry

Inventor
John S. Stevenson.
By Whittemore Hulbert & Whittemore
Attys

J. S. STEVENSON.
TIRE.
APPLICATION FILED DEC. 23, 1907.

934,472.

Patented Sept. 21, 1909.
2 SHEETS—SHEET 2.

Witnesses
W. K. Ford.
James P. Barry.

Inventor
John S. Stevenson
By Whittemore, Hulbert & Whittemore
Attys

UNITED STATES PATENT OFFICE.

JOHN S. STEVENSON, OF DETROIT, MICHIGAN.

TIRE.

934,472.

Specification of Letters Patent.   Patented Sept. 21, 1909.

Application filed December 23, 1907. Serial No. 407,740.

*To all whom it may concern:*

Be it known that I, JOHN S. STEVENSON, a citizen of the United States of America, residing at Detroit, in the county of Wayne and State of Michigan, have invented certain new and useful Improvements in Tires, of which the following is a specification, reference being had therein to the accompanying drawings.

The invention relates particularly to a wheel for automobiles, and more especially to a puncture-proof tire therefor, and it consists in the novel and peculiar construction of the tire and in the arrangement and combination of the various parts, as will be more fully hereinafter set forth.

Figure 1:
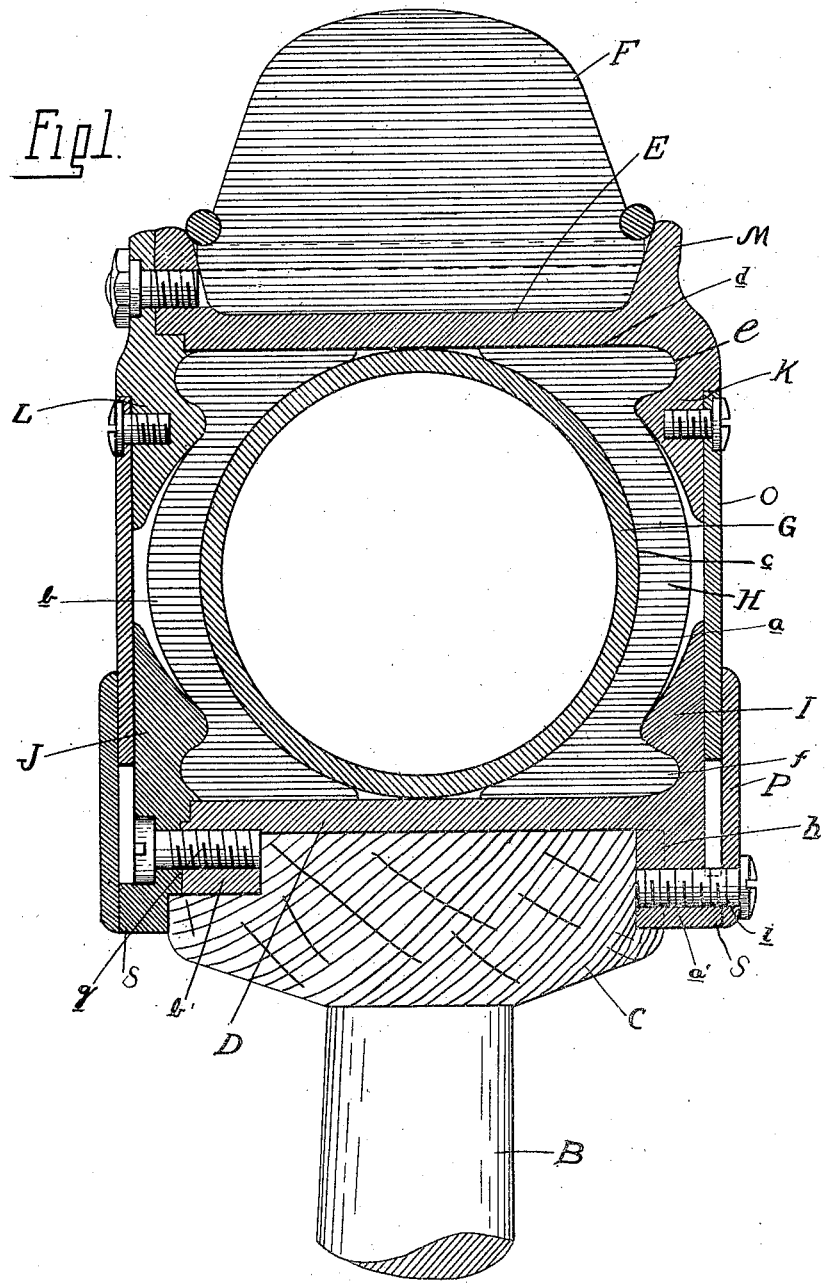
Figure 2:
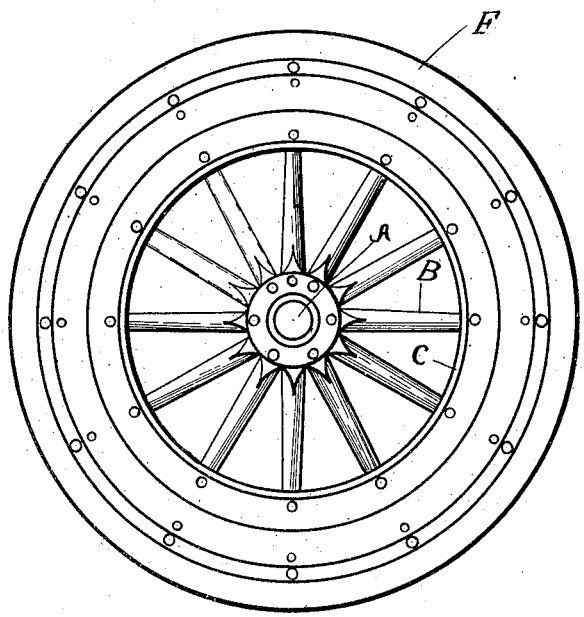

In the drawings,—Figure 1 is a vertical central cross-section through a portion of a vehicle wheel embodying my invention; and Fig. 2 is a view in side elevation thereof.

A represents the usual hub of the wheel, B the spokes and C the felly.

D is a rim,—preferably of metal,—fitted about the felly, and E is an outer rim, spaced from the inner, about which is encircled a tire of hard rubber or other similar material F. Interposed between the two rims is a yielding abutment,—preferably in the form of a pneumatic tube G,—and H is a sectional covering for the tube. This covering is preferably composed of two annular members $a$ and $b$ of any suitable material, such as canvas or rubber, having the body portions intermediate the rims concaved as at $c$, and the upper and lower portions $d$ flat so as to abut against the inner and outer faces respectively of the outer and inner rims. The cover sections are also formed with annular hook-shaped sections $e$ and $f$ adapted to engage hook-shaped flanges hereinafter described upon the rims, the engagement of the rim flanges and the cover sections serving to hold the parts in their proper relative positions.

The inner rim D is formed preferably with an outwardly-projecting marginal flange I integral in this instance with the rim and fashioned on its inner face to form a hook adapted to engage the adjoining hook-shaped section of the covering. J is a similar flange at the opposite edge or margin of this rim and detachably connected thereto. The rim is further provided with inwardly-extending annular lug sections $a'$ $b'$ seated in grooves or recesses formed in the felly for that purpose. The detachable flange J is secured to the lug sections $b'$ by suitable screws or other fastening devices $g$. The outer rim E is provided with similar marginal flanges K and L respectively integral with and detachable from the rim, and the rim carries the usual out-turned channel flanges M, between which the tire F is seated, the marginal flange L being detachably connected to one of these channel flanges as indicated.

To prevent relative sidewise movement of the rims, guide flanges are employed adapted to engage annular flange guides, the flanges being preferably carried by one of the rims and the guides by the other as indicated. I have here shown the guide flanges O detachably connected to the marginal flanges of the outer rim E and the flange sockets or guides carried by the inner rim and formed preferably by annular flanges P spaced from the marginal rim flanges by lugs $s$ projecting laterally from the latter and detachably connected by securing devices $i$.

In practice, the pneumatic tube intermediate the rims acts in the same manner as the ordinary pneumatic tire, giving the desired resiliency and absorbing the shocks and jars, while at the same time it is effectively protected from injury, the rim sections, and flanges and guides associated therewith forming a sectional radially yielding housing in which the pneumatic tube is inclosed.

What I claim as my invention is,—

1. In a vehicle wheel, the combination with a felly, of spaced inner and outer rims thereon, each of said rims being provided with inwardly and outwardly projecting marginal flanges, the inwardly projecting flanges of the one and the outwardly projecting flanges of the other being hook-shaped, and one of each of said outwardly and inwardly projecting hook-shaped flanges being detachable, coöperating guide flanges detachably secured respectively to the hooked flanges of the outer rim and to the inwardly projecting flanges of the inner rim, a tire interposed between the rims, a sectional covering for the tube flanged to engage the hook-shaped flanges, and a tire encircling the outer rim and seated between the outwardly projecting marginal flanges.

2. In a vehicle wheel, the combination with a felly, of spaced inner and outer rims thereon, each of said rims being provided with inwardly and outwardly projecting marginal flanges, the inwardly projecting flanges of the one and the outwardly projecting flanges of the other being hook-shaped, and one of each of said outwardly and inwardly projecting hook-shaped flanges being detachably secured to the corresponding oppositely projecting flange, guide flanges detachably carried by the hooked flanges of one rim, the inwardly projecting flanges of the other rim having laterally projecting lugs, flanges detachably secured to said lugs and spaced from the hooked flanges of the latter rim whereby a guide is formed for the guide flanges of the other rim, a tire interposed between the rims, a sectional covering for the tube having portions engaging said hook-shaped flanges, and a tire encircling the outer rim and seated between the outwardly projecting marginal flanges.

3. In a vehicle wheel, the combination with a felly, of spaced inner and outer rims thereon comprising oppositely disposed channel-shaped members corresponding in width to the width of the felly, each having its body portion and side flanges formed in a single integral construction, and being provided with hook-shaped flanges projecting oppositely from the flanges of the channel, one of each of said hook-shaped flanges being detachable, guide flanges detachably secured to each of said rims for preventing relative sidewise movement of the latter, a yieldable abutment between the rims, and a tire encircling the outer rim.

In testimony whereof I affix my signature in presence of two witnesses.

JOHN S. STEVENSON.

Witnesses:
  NELLIE KINSELLA,
  JAMES P. BARRY.